April 3, 1934.  G. B. CROUSE  1,953,894
METHOD OF COMPUTING SHIP'S POSITION AND INSTRUMENT THEREFOR
Filed June 22, 1931  6 Sheets-Sheet 1

Inventor:
George B. Crouse
By A. Miller Belfield
Atty.

April 3, 1934.  G. B. CROUSE  1,953,894
METHOD OF COMPUTING SHIP'S POSITION AND INSTRUMENT THEREFOR
Filed June 22, 1931   6 Sheets-Sheet 4

Inventor:
George B. Crouse
By A. Miller Belfield
Atty.

April 3, 1934.  G. B. CROUSE  1,953,894
METHOD OF COMPUTING SHIP'S POSITION AND INSTRUMENT THEREFOR
Filed June 22, 1931   6 Sheets-Sheet 6

Inventor:
George B. Crouse
By A. Miller Belfield
Atty.

Patented Apr. 3, 1934

1,953,894

UNITED STATES PATENT OFFICE 1,953,894

METHOD OF COMPUTING SHIP'S POSITION AND INSTRUMENT THEREFOR

George B. Crouse, Newark, N. J., assignor to Edward S. Cole, New York, N. Y.

Application June 22, 1931, Serial No. 545,897

41 Claims. (Cl. 235—61)

The present invention relates in general to an instrument for indicating the position of a movable object on the earth, and more particularly to a latitude and longitude indicator.

One of the objects of the present invention is to provide a novel instrument for indicating the latitude of a ship or other movable object.

Another object is to provide a novel instrument for indicating the longitude of a ship or other object.

Another object is to provide a novel instrument for indicating both latitude and longitude of a movable object.

Another object is to provide an instrument for continuously indicating the latitude and longitude of a moving carrier.

Another object is to provide an instrument of this character in which the longitude reading is automatically compensated, depending upon the latitude of the moving carrier.

Another object is to provide an instrument of this character which may be controlled and operated responsive to a compass and a log of the usual character.

A further object is to provide an instrument of this character that will function to indicate the true position of the carrier with respect to the earth, irrespective of whether it passes the equator or not.

A further object is to provide an instrument of this character which may be set manually to the carrier's position and will then automatically indicate its position, irrespective of its course or movement.

Still another object is to provide an instrument of this character which can be calibrated from time to time during the movement of the carrier to cause it to be accurate with astronomical findings.

A still further object is to provide a simple, rugged, effective and efficient device with the foregoing characteristics.

There are other objects of my invention which, together with the foregoing, will be described in the detailed specification that is to follow, taken in conjunction with the accompanying drawings forming a part thereof.

I have illustrated an embodiment of my invention as indicating the carrier's position in terms of latitude and longitude as this is the convenient manner of giving the position of the carrier.

In practicing my invention I provide an element that is responsive to the compass course of the ship or carrier and which is also responsive to the distance traveled. This element controls a latitude indicating device in such manner that the latitude of the carrier is indicated. The same element indirectly controls the longitude indicator which is responsive to the element directly so that its movement is somewhat altered according to the latitude of the carrier. It is obvious, of course, that the longitude indicator must vary with the latitude in order that it may be correct; that is, depending upon the latitude, the movement, or the longitude of the ship, changes for a given distance of travel as the circumference of the earth varies. The formula by which this change occurs is well known being a function of the latitude or 1 over the cosine. In this manner the element responsive to the ship's log and the compass automatically operates the longitude indicator.

The position of a ship or other craft in any situation in which fixed and identifiable objects on the earth's surface are not visible, may be determined by astronomical observation and a knowledge of the time at some fixed preselected meridian. If the celestial objects were always visible, the determination of position, and therefore navigation, would be a comparatively simple matter. Unfortunately, weather conditions impair the visibility to such an extent that a large portion of the course of a craft is determined by a method known as "dead reckoning". Briefly, this process is as follows: The position of the craft being known at some previous time, its present position is determined from records of the course on which the ship was held and the speed in which it was propelled during the elapsed time. From this data a line is laid out on a chart starting from the previously known position of a direction corresponding to the course and of a length corresponding to the distance traveled to the scale of the chart. The end of this line then terminates at the present position of the craft on the chart. Alternatively from the said data enumerated above the present position of the craft may be computed by methods of spherical trigonometry. In either case the data on the course is secured from the compass and on speed from a ship's log or from the speed of revolution of the propeller's shafts suitably correct. Furthermore there are additional factors of consideration such as currents both in the medium of travel and of the sea and the air as well.

Obviously the methods above described inherently contain many sources of error both in the observation and recording of the original data and in the graphical or mathematical solution arrived at from the data. By the method outlined above, I provide an instrument in which all these sources of error are eliminated and the true position of the ship given at all times.

Referring now to the drawings.

In the drawings like reference characters refer to similar parts throughout.

Figure 1:
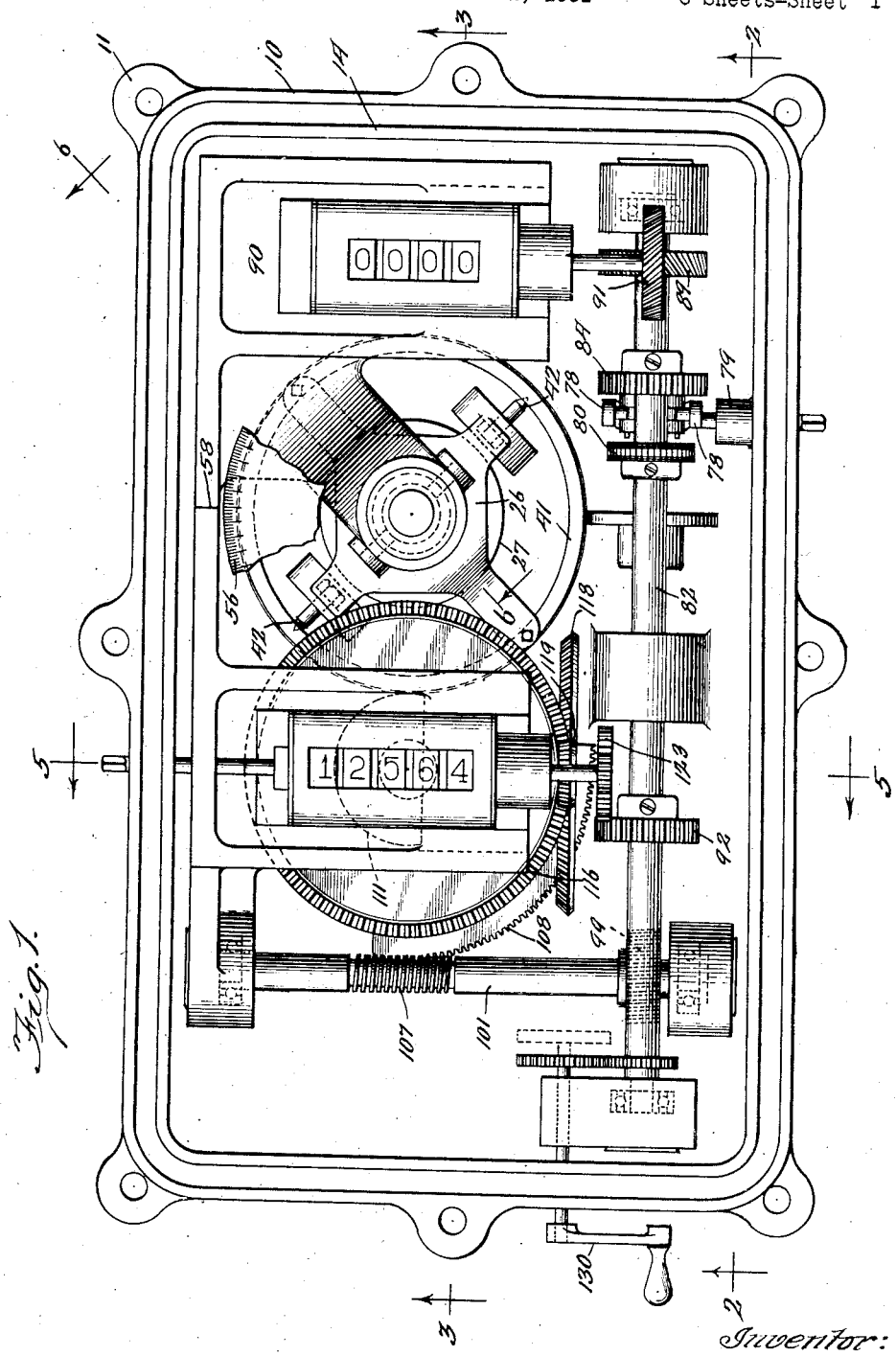
Fig. 1 is a top plan view of my improved instrument with the cover removed.
Figure 2:
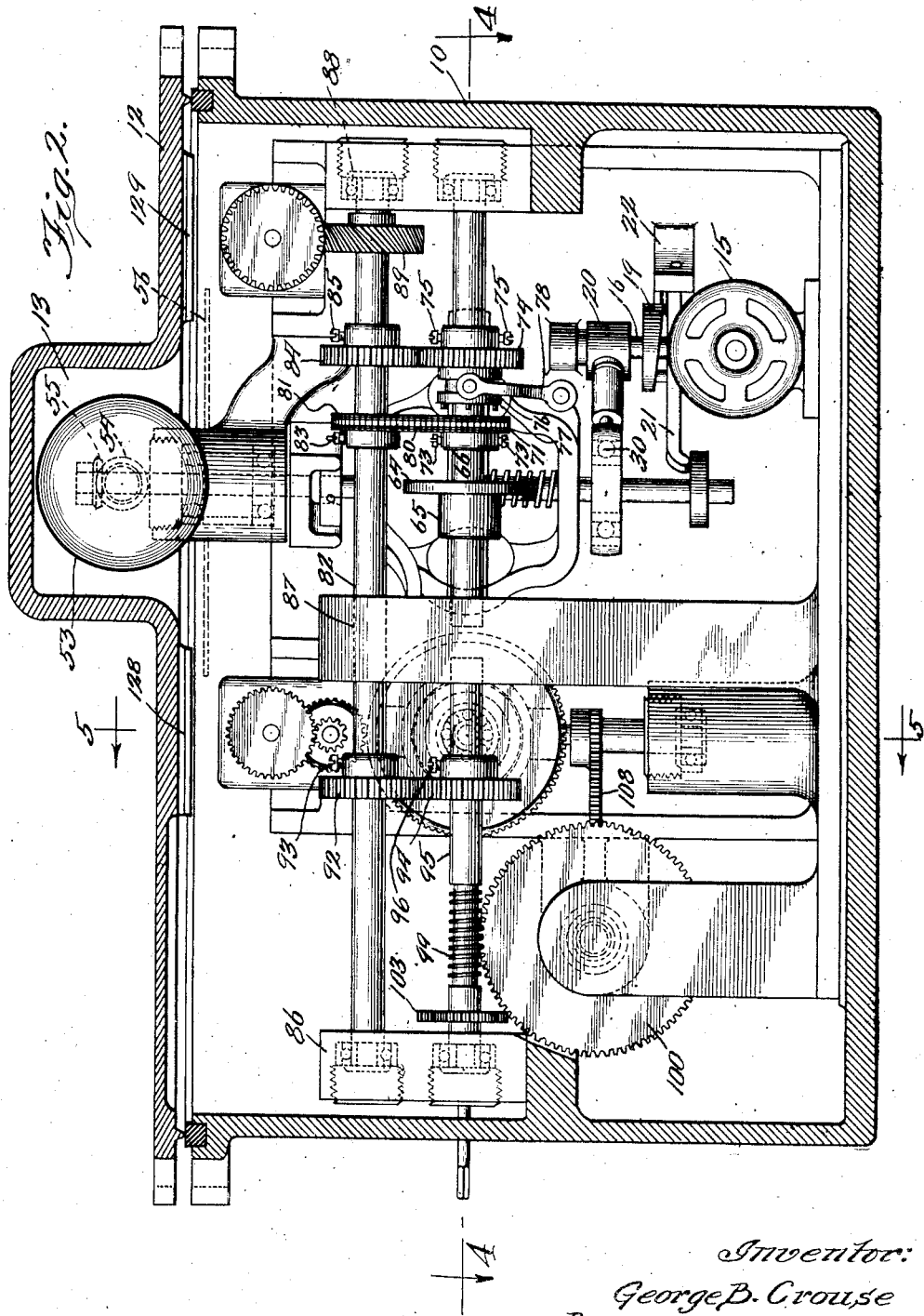
Fig. 2 is a side elevation thereof taken along the line 2—2 of Fig. 1.
Figure 3:
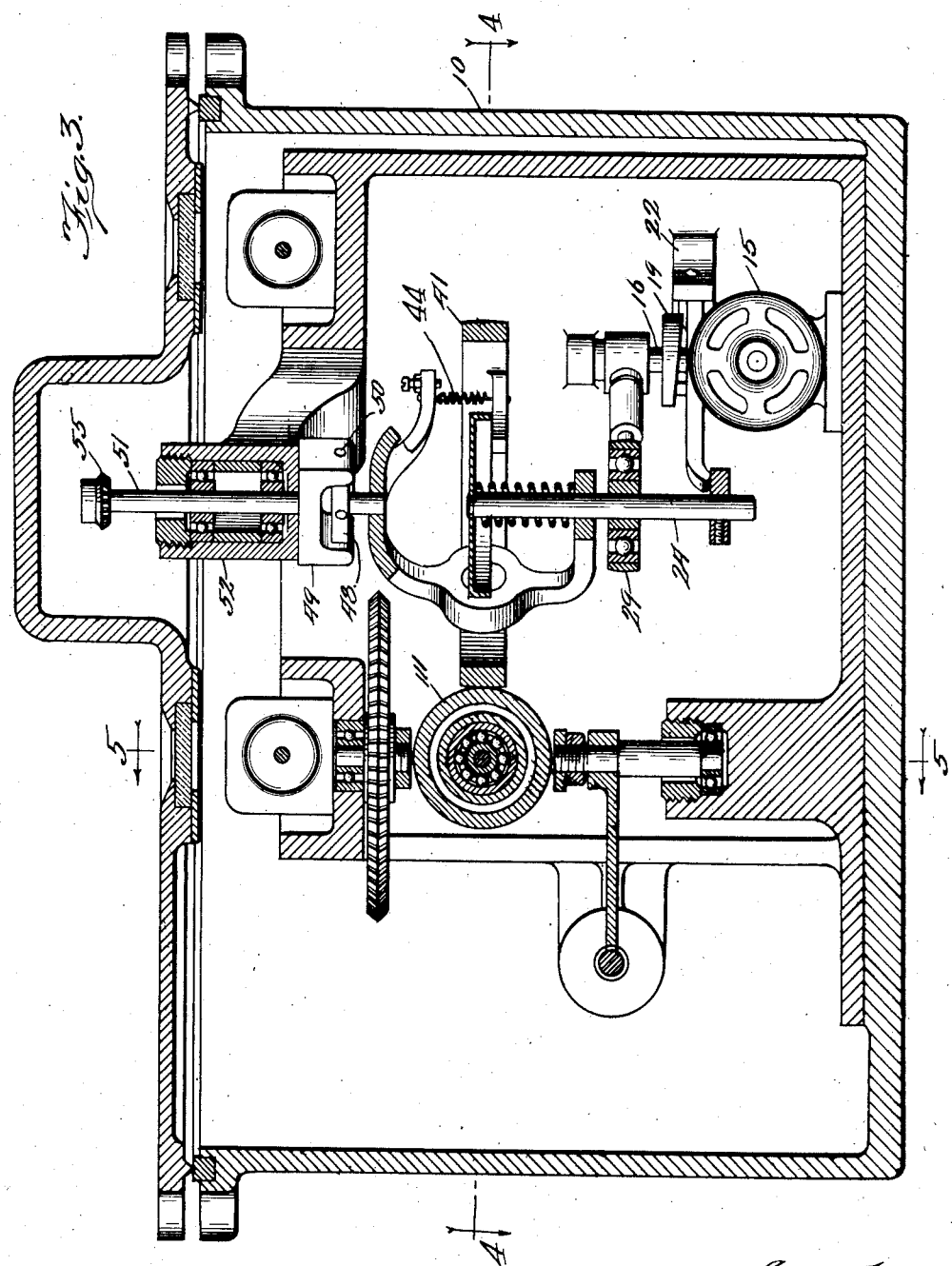
Fig. 3 is a sectional elevation thereof taken along the line 3—3 of Fig. 1.

The reference character 10 indicates a rectangular shaped container or casing provided with mounting lugs 11. The rectangular shaped container 10 is provided with a cover member 12 having a cavity 13 formed therein. A frame 14 is mounted within the container 10 in any suitable or desired manner. The frame 14 carries various bearings and supports the mechanism of my improved instrument.

Figure 6:
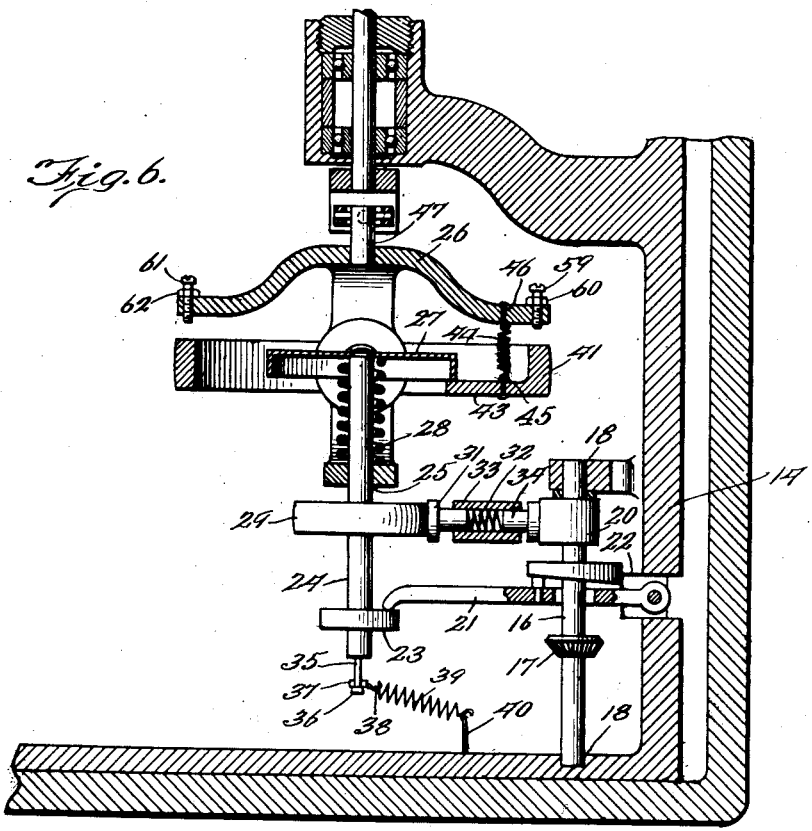
Fig. 6 is a fragmentary section taken along the line 6—6 of Fig. 1.

A small motor 15 is mounted on the frame 14 in the lower portion of the casing 10. This motor drives a shaft 16 through a bevel gear 17, (Fig. 6) which shaft is rotatably mounted in the bearings 18 in the frame 14. The shaft 16 has cam members 19 and 20 suitably splined thereto. The cam member 20 is eccentrically mounted and the cam member 19 is mounted concentrically but has a diagonally shaped cam surface for tilting movement of the operating member 21 which is pivotally mounted in a bracket 22 affixed to the frame 14.

The operating member 21 is adapted to engage a circular member 23 suitably affixed to a shaft 24, slidably mounted in a bearing 25 in a rotatable frame 26. The shaft 24 has a cup-shaped member 27 fastened to its upper end in any suitable manner and is resiliently held in place by compression spring 28 encircling it and maintained between the cup-shaped member 27 and the frame 26. The shaft 24 is also provided with a rotatable member 29 mounted on ball bearings 30 and adapted to be engaged by pin 31 resiliently mounted by a spring 32 held in an opening in a bracket 33 attached to the main frame 14. The other end of the spring 32 supports a pin 34 adapted to engage the eccentrically mounted cam 20 on the shaft 16. The lower end of the shaft 24 carries a pin 35 having a head 36 and a rotatable member 37 mounted thereon, with an eye 38 affixed thereto, to which is attached a spring 39 for maintaining the frame 26 in position. The other end of the spring 39 is attached to a hook 40 mounted in the frame 14.

The frame 26 pivotally supports a ring member 41 by pivot members 42. The ring 41 is provided with an inwardly extending tongue or extension 43 adapted to engage the cup member 27. The ring 41 is held in retracted position by a spring 44 attached to a hook 45 in the extension 43 of the ring 41. The other end of the spring is held by a hook 46 attached to the rotatable frame 26.

Figure 7:
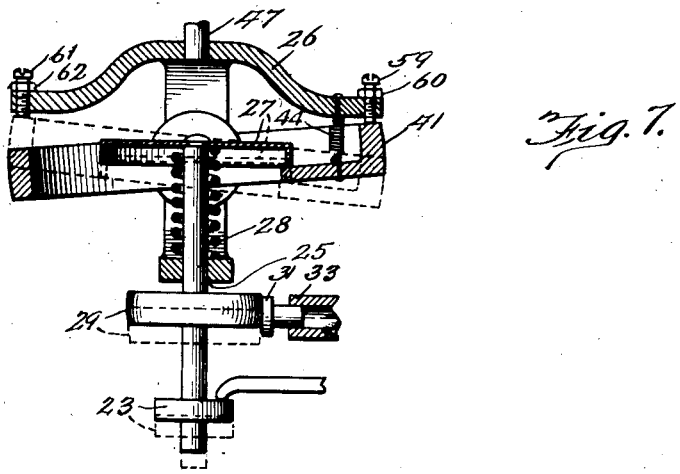
Fig. 7 is a similar fragmentary section illustrating a different position of the controlling element.

The rotatable frame 26 has an adjustable stop which comprises a screw 59 threaded into the rotatable frame 26 and provided with a lock nut 60. This stop limits the tilting movement of the ring 41 in one direction. Its tilting movement in the other direction is limited by a similar adjustable stop comprising the screw 61 threaded into the frame 26 and having a locking nut 62. The spring 44 normally holds the ring 41 in position shown by the full lines in Fig. 7. The other position of the ring 41 is shown by the dotted lines in Fig. 7.

The upper end of the frame 26 is provided with a stub shaft 47 terminating in a block 48, fastened thereto in any suitable manner, and pivotally attached to a yoke 49 by a pin 50.

The yoke 49 is suitably affixed to a shaft 51 carried in a ball bearing 52. The shaft 51 is driven by a servo motor 53 through gears 54 and 55. The servo motor 53 is suitably supported upon the frame 14. A dial 56, similar to a compass dial, is suitably affixed to the shaft 51 and is readable against a lubber's line 58.

The servo motor 53 is connected to the compass in such manner that the shaft 51 is oriented with respect to the lubber's line 58 to correspond to the compass indication. This may be done by any suitable distance indicating compass system to control the service motor, such as the "selsyn" type or position indicating type.

The motor 15 is periodically operated to rotate the shaft 16 through one revolution every time the ship travels a predetermined distance. This is accomplished by controlling the motor 15 from the ship's log. The particular manner in which this is accomplished is immaterial so long as the motor 15 is operated periodically in one revolution in accordance with the predetermined travel of the ship. However, the motor 15 may be operated from the ship's log in the manner shown in the co-pending application of Edward S. Cole and Arnold Holst, Serial No. 497,506, filed November 22, 1930.

By the operation of the servo motor 53, the shaft 51 is oriented to a position corresponding to the direction that the ship is travelling. The rotation of the shaft 51 brings about the rotation of the ring 41 carried by the rotatable frame 26. The operation of the motor 15, to drive the shaft 16 through one revolution, brings about the movement of the operating member 21 as a result of the rotation of the cam 19 in a downward direction. This shifts the shaft 24 downwardly in the bearing 25 against the compression of the spring 28 and causes the cup-shaped member 27 to engage the projection 43 of the ring 41 and tilt it against the compression of the spring 44 against the stop comprising the screw 61, as indicated by the dotted lines in Fig. 7. The shaft 24 is shifted downwardly so that the rotatable member 29 is in the position shown by the dotted lines in Fig. 7 with respect to the pin 31.

The operation of the member 20, which occurs previous to the longitudinal movement of the shaft 24 just described, applies pressure against the member 29 so as to shift the shaft 24 and the rotatable ring 41, against the tension of the spring 39, on the universal joint which comprises the block 48 and the yoke 49. This forces the ring 41 into contact with circular wheel 64 and the rotatable element 111.

The circular wheel 64 is suitably affixed to a boss 65 which is movably held on a shaft 66 by a set screw 67. The shaft 66 is supported upon ball bearings 69 and 70 in the frame 14. The shaft 66 is provided with a sprocket 71 rotatably held thereon but prevented from longitudinal movement thereon by set screws 73, and is also provided with a spur gear 74, rotatably held thereon but prevented from longitudinal movement with respect thereto by set screws 75. The set screws 73 and 75 may run in grooves in the shaft 66.

A clutch member 76, having pins 77 on both surfaces, is slidably keyed to the shaft 66 and is provided with an operating member 78 in rotatable engagement therewith. Openings are provided in one face of the sprockt 71 and the gear 74 to be engaged by the pins 77 of the clutch member 76.

The operating member 78 extends through the casing 10 in a bearing 79 and may be operated by a suitable key. The sprocket 71 is provided with a chain 80 that passes around a sprocket 81 suitably affixed to a shaft 82 by a set screw 83. The spur gear 74 is in engagement with a spur gear 84 suitably affixed to the shaft 82 by a set screw 85.

The shaft 82 is mounted in ball bearings 86, 87 and 88 in the main frame 14. The shaft 82 is provided at one end with a gear 89 adapted to operate a counting device or latitude indicator 90 through a gear 91.

The latitude indicating device is preferably calibrated to read in tenths of a minute of latitude though it may be calibrated to indicate as fine an amount as desired.

The shaft 82 is provided with a spur gear 92 suitably affixed thereto by a set screw 93. The spur gear 92 is adapted to mesh with a spur gear 94 mounted upon a stub shaft 95 in any suitable or desired manner, such as by a set screw 96.

The shaft 95 is rotatably mounted in ball bearings 97 and 98 in portions of the main frame 14. The shaft 95 is provided with a worm 99 adapted to drive a worm wheel 100 suitably affixed to a shaft 101 rotatably mounted in bearings 102 in the frame 14. The shaft 95 is also provided with a spur gear 103 meshing with a spur gear 104 mounted upon a stub shaft 105 in a bearing 106 in the main frame 14 and penetrating the casing 10. The end of the stub shaft 105 may be rotated by means of a key crank 130, or otherwise.

The shaft 101 is provided with a worm 107 adapted to engage a toothed sector 108 suitably affixed to a stub shaft 109 supported in a ball bearing 117 mounted in the main frame 14. The upper end of the stub shaft 109 is fastened to a bracket 110 which provides a support for a hemispherically shaped member or wheel 111 attached to a shaft 112 carried in ball bearings 113 in the bracket 110. The upper end of the bracket 110 is connected to a shaft 114 mounted in a ball bearing 115 in an extension in the main frame 14. The shaft 114 also carries a gear 116 rotatable thereon.

The shaft 112 terminates in a bevel gear 118 adapted to engage one surface of the gear 116. The other surface of the gear 116 meshes with a bevel gear 119 rotatably mounted upon a shaft 120 supported in an extension of the frame 14 by a bearing 121.

A spur gear 122 is mounted concentrically to the bevel gear 119 and is rotatable therewith. The spur gear 122 meshes with a spur gear 123 attached to a shaft 124 which drives the longitude indicating mechanism 125 mounted upon the main frame 14.

The longitude indicating mechanism 125 may be any simple counter, calibrated to read in tenths of a minute of longitude. A shaft 126 extending from the counting mechanism 125 and penetrating the casing 10, may be provided for setting the longitude indication as desired. The cover 12 may, of course, be provided with transparent windows 128 and 129 for reading the longitude and latitude indicators respectively.

Having described in detail the manner in which my improved latitude and longitude indicators may be constructed, I shall now explain its operation as well as certain relations between the various parts, necessitated by their functioning.

As has been briefly mentioned heretofore, the shaft 51 and the mechanism supported by the rotatable frame 26, is oriented by a servo motor to the direction of travel of a ship. Obviously, this may be done by hand if it is not desired to transmit the indications from the compass automatically. A compass dial 56, oriented against the lubber's line 58, is provided for this purpose. However, I prefer to employ this device in conjunction with a compass which may be of the gyroscopic or inductor type, and a compass repeater system to control the servo motor.

The ring member 41, pivotally carried on the frame 26, has an outer surface which is a spherical segment whose boundaries are planes equidistant from and parallel to a plane through a great circle of a sphere. This segmental or ring member 41, pivotally mounted in the rotatable frame 26, is capable of a movement through an arc about an axis lying in the plane of the aforementioned great circle on the pivots 42. As explained before, the shaft 51, carrying the rotatable frame 26, is oriented by the compass so that the relation of the segmental member 41 is changed with respect to the wheel 64 mounted upon the shaft 66, and with respect to the hemispherical wheel 111. These wheels are mounted at exactly 90 degrees to each other.

The wheel 64 controls the latitude indication while the wheel 111 controls the longitude indication. Both of these wheels are capable of movement in either direction.

As mentioned before, the motor 15 is energized periodically in accordance with definite distances of travel of the ship from the ship's log, to rotate the shaft 16 through one revolution. This brings about, first of all, the shifting of the shaft 24 and the rotatable frame 26 on the universal joint comprising the members 48 and 49, so as to bring the segmental member 41 into contact with the wheels 64 and 111, controlling the latitude and longitude indications respectively. The cam 19 then operates to cause the shaft 24 to move longitudinally, thereby rotating the segmental member 41 through its arc. These actions are all brought about by the motor 15 which occurs at intervals, controlled by the ship's log in such manner that the action is repeated at definite small increments of distance traveled by the craft. It will be apparent that by suitable choice of dimensions of the parts and the arc of rotation of the segmental member 41 in relation to the magnitude of the distance increment, that the motion of the wheel 64 and also the wheel 111 may be made directly proportional to the latitude and longitude angle traversed by the craft.

For example, let us first assume that the craft is moving directly northward so that its entire movement is expressed in change of latitude. Under these conditions the dial 58 will be at zero either as a result of hand operation or by control from the compass. This will swing the rotatable frame 26 into such position that the axis of rotation of the segmental or ring member 41 is parallel to the axis of rotation of the wheel 64. Therefore, at each recurrence of the sequence of action described above the wheel 64 will be moved through the maximum arc which the swing of the segmental member 41 is capable of imparting to it. Let us assume that .1 knots is the distance increment; then each time the segmental member 41 comes into contact with the wheel 64, it rotates through its limited arc corresponding to a fraction of a minute of latitude. The movement of the wheel 64, assuming for the moment that the craft is to the north of the equator, in which position the member 78 will be in position to force the clutch 76 into engagement with the sprocket 71, rotates the shaft 82 a small amount through the chain 80 and the sprocket 81. This will impart a movement to the latitude indicator 90 through the gears 89 and 91. Because the various shafts are mounted in ball bearings, the friction element is very small and the frictional contact of the member 41 with the wheel 64 is ample to bring about the operation of the latitude indicator in the manner mentioned. Consequently as the ship is travelling due northwardly, each tenth of a knot will be directly indicated on the latitude indicator in fractions of a minute of latitude. In the position of the rotatable frame 26, where it has been assumed that the ship is travelling due northwardly, the axis of rotation of the segmental member 41 is in the same plane as the axis of rotation of the longitude indicating hemisphere 111 and no movement of the segumental member 41 occurs with respect to the longitude indicating wheel 111. Consequently there will be no motion imparted to this wheel. Therefore, when proceeding due north or south, there is no change in longitude and no change in the longitude indication.

Let us now assume that the craft proceeds directly south. The shaft 51 and consequently the dial 58 will be rotated to read 180 degrees which will bring the axis of rotation of the segmental member again parallel to the axis of the wheel 64, but the direction of motion imparted to the wheel by the segmental member 41 will be opposite to the cases first assumed, so that the latitude change will be in the opposite sense. This will subtract from the latitude indication of the indicator 90 through the mechanism described. If the craft moves on a due east or due west course, its movement will not cause any change of latitude. This can be seen since the shaft 51 will be moved so that the dial 58 reads 90 degrees or 270 degrees, bringing the axis of rotation of the segmental member 41 perpendicular to the axis of the wheel 64, and no motion of the latter will result. At any intermediate course, the motion imparted to the receiving wheel 64 will be a function of the cosine of the angle to which the course dial is set, and therefore identically proportional to the actual change in latitude of the craft when moving on a set course. This change in latitude will be set up on the latitude indicator 90. Consequently, when the device is installed, or if manually operated at any time when the actual latitude of the craft is known and set on the counter 90 by rotation of the shaft 105 which brings about the movement of the shaft 95 through the spur gears 104 and 103 and the shaft 82 through the spur gears 94 and 92 and thence to the latitude indicator 90, and thereafter the course dial is kept set at the actual course travelled by the craft either automatically or by hand, the above movements occur at fixed intervals of travel and a continuous indication of the actual latitude of the craft will appear upon the latitude indicator 90. In this same manner the latitude may be checked by astronomical observation and corrected if necessary.

If the ship crosses the equator, it is, of course, necessary to reverse the direction of counting of the counter 90. This is accomplished by shifting the clutch member 76 from engagement with the sprocket 71 into engagement with the gear 74 by a key. Thereafter any movement of the wheel 64 has the reverse effect upon the counter 90.

Figure 4:
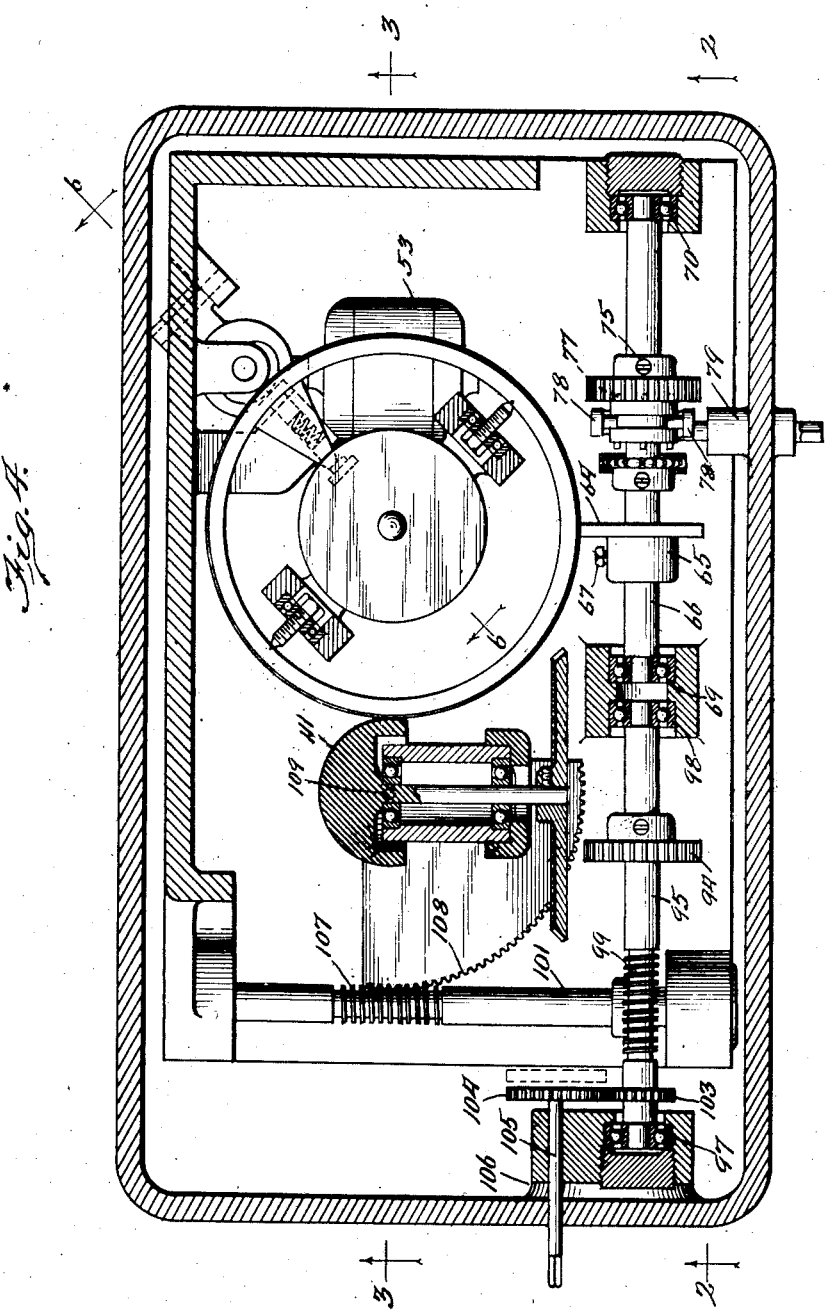
Fig. 4 is a longitudinal cross section thereof taken along the line 4—4 of Fig. 2.
Figure 5:
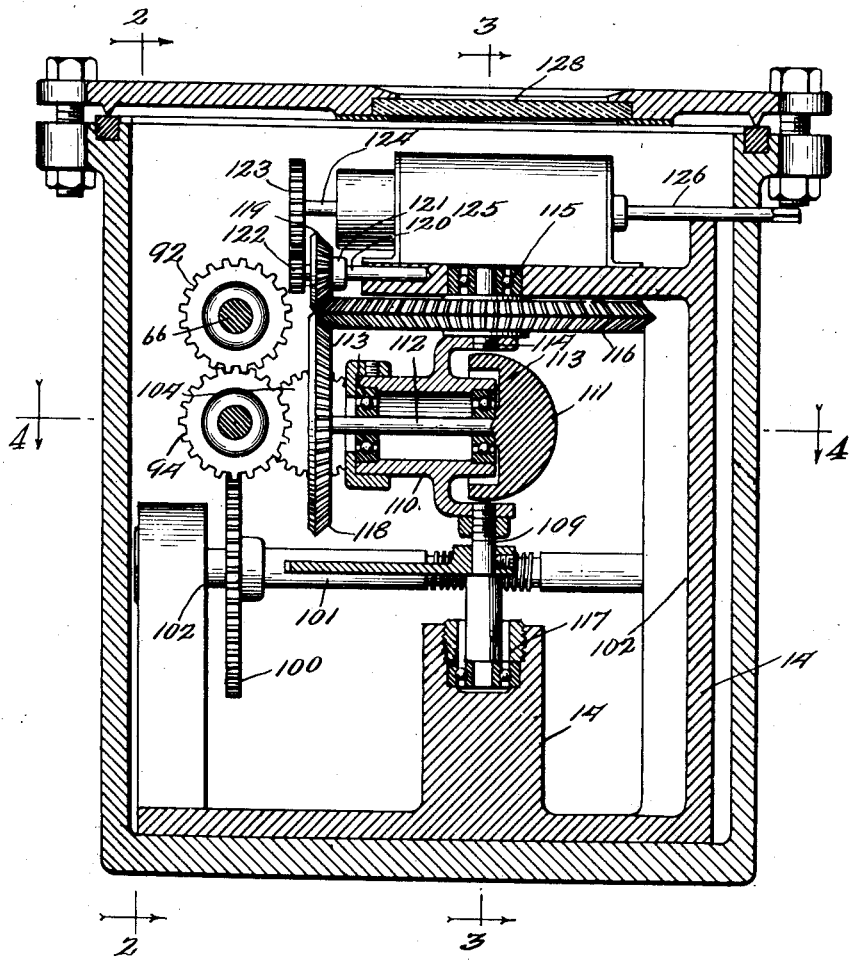
Fig. 5 is a cross section thereof taken along the line 5—5 of Fig. 1.

It will be apparent at once that on the equator longitude could be indicated in the same manner as latitude, by locating a wheel similar to the wheel 64 with its axis of rotation perpendicular to the latitude wheel. However, at any other latitude than zero, the longitude indication would be incorrect since the indication of longitude is a function of one over the cosine of latitude. This mathematical relation is provided for by constructing the longitude indicating wheel in the form of a hemisphere 111, as shown, and orienting it about the point 109 corresponding to the latitude. In the position shown in Fig. 4, the longitude indicating wheel is in the position for zero latitude. As the latitude changes, the hemisphere 111 must be rotated on the shaft 109 so that its effective radius at the point where motion is transmitted to it by the segmental member 41 is a function of one over the cosine of latitude.

The longitude wheel 111 is arranged for normal rotation responsive to the operation of the segmental or ring member 41 on the shaft 112 rotating in the bearings 113 carried on the bracket 110.

As explained before, the bracket 110 is rotated as a unit by the operation of the shaft 82 through the gears 92, 94, shaft 95, worm 99, worm wheel 100, shaft 101, worm 107, gear 108 and shaft 109. This gearing is so proportioned that the rotation of the shaft 82 through an amount corresponding to one degree of latitude will cause the bracket 110 to rotate through an angle of one degree about the axis 109. The motion imparted to the hemispherical wheel 111 by the segmental member 41 is indicated on the counter 125 through the shaft 112 and gears 118, 116, 119, 122 and 123, as explained before. It will be seen that this arrangement of gears permits the housing or bracket 110 to be rotated or oriented in accordance with the latitude, as explained before, while maintaining a driving connection through the shaft 112 to the longitude indicator 125. This permits the counter 125 to be stationary without at the same time introducing any error into the longitude counter. The counter wheels are arranged to indicate so that rotation of the counter in the same direction will cause it to indicate successively up to 180 degrees and then rotation continuing in the same direction the counter will successively indicate smaller values down to zero.

It is to be pointed out that when the vessel is moving due east or west, the rotatable frame 26 will be rotated so that there will be no change or no motion imparted to the latitude wheel 64, and that maximum movement will be transmitted to the wheel 111 which brings about a change in longitude indication proportionally to the travel of the ship as indicated by the ship's log. It will be obvious that it is necessary to provide a hemispherically shaped wheel 111 in order to give proper longitude indications for the reason that when travelling due east or west in zero latitude a given distance of travel of the ship will equal a certain number of degrees of longitude. At 45 degrees latitude the craft's position, after the same distance, will be at a much greater longitude. Consequently mechanism must be provided as there is the change in latitude to change the effect of the segmental member 41 upon the longitude indicator, and this is accomplished by causing the latitude mechanism to effect movement of the bracket 110 carrying the hemisphere 111 so that a greater movement will be imparted to the shaft 112 as the latitude is changed from zero up until the pole is reached, whereupon there will be no change in longitude whatsoever. This follows because at this point the axis of rotation of the hemisphere 111 will be perpendicular to the movement of the segmental member 41.

It will be seen that in the operation of the device the shaft 51 is oriented in accordance with the direction of travel of the vessel and the motor 15 is periodically energized from the ship's log after the travel of a definite distance to rotate the shaft 16 once, first of all forcing the segmental member 41 into engagement with the latitude and longitude wheels 64 and 111 respectively and then the shaft 24 is operated to tilt the segmental member 41 through its fixed arc. As the shaft 16 continues to rotate, the portion of the cam permits the rotatable frame 26 to assume its normal position either under influence of gravity or preferably under the influence of the spring 39 upon the segmental ring 41 and the shaft 24 is restored to normal by further rotation of the shaft 16, bringing the cam 19 out of engagement with the operating member 21.

A key 130 is provided for setting the latitude and longitude indicators as well as to effect the change over at the equator.

It will be seen that my improved instrument, after being set to the present latitude and longitude of the craft and connected to the compass and ship's log, will give a continuous indication of the craft's position in terms of latitude and longitude at all times irrespective of its direction of travel or position on the earth, thereby doing away with all the possibilities of error which may arise from a common method of charting the course of a ship, known as "dead reckoning". Furthermore, the position of the craft, as indicated on my improved instrument, can be corrected if it is found not to be in strict accord with proper astronomical observations.

It will be seen that I have provided a novel method of indicating the position of a vessel or other craft, which consists in orienting a member in accordance with the direction of travel and periodically moving it to affect latitude and longitude indicators in the proper manner.

Having described certain specific embodiments of my invention, I am aware that many changes, deviations and departures may be made without departing from the spirit and scope thereof, as indicated in the appended claims.

I claim:

1. In a device for indicating the position of a vessel on the earth, a latitude indicator, a longitude indicator, a ship's log and a compass, an element and means for operating said element from said ship's log and from said compass to control said indicators.

2. In a device for indicating the position of a vessel on the earth, a latitude indicator, a longitude indicator, a ship's log and a compass, an element mounted for movement in two planes, means for moving said element in one plane responsive to said ship's log and means for moving it in the other plane responsive to said compass, and connections between said element and said indicators for operating the same.

3. In a device for indicating the position of a vessel on the earth, a latitude indicator, a longitude indicator, a ship's log and a compass, an element mounted for rotation upon two different axes to control the operation of said indicators, means for rotating said element on one axis as a result of the operation of said ship's log, and means for rotating said element on its other axis as a result of the operation of said compass.

4. In a device for indicating the position of a vessel on the earth, a latitude indicator, a longitude indicator, a ship's log and a compass, an element mounted for rotation upon two different axes to control the operation of said indicators, means for orienting said element about one of its axes as a result of the operation of said compass, and means for rotating it about the other axis as a result of the operation of said ship's log to variably affect said indicators.

5. In a device for indicating the position of a vessel on the earth, a latitude indicator, a longitude indicator, a ship's log and a compass, an element mounted for rotation upon two different axes to control the operation of said indicators, means for orienting said element about one of its axes as a result of the operation of said compass, and means for periodically rotating it about the other axis as a result of the operation of said ship's log to affect said indicators.

6. In a device for indicating the position of a vessel on the earth, a latitude indicator, a longitude indicator, a ship's log and a compass, a circular element mounted for rotation upon two different axes to control the operation of said indicators, and means for correlating the action of said log and compass to operate said indicators.

7. In a device for indicating the position of a vessel on the earth, a latitude indicator, a longitude indicator, a ship's log and a compass, an element mounted for rotation on two different axes, means for orienting said element about one axis in accordance with the indication of said compass, means for rotating said element upon its other axis as a result of the operation of said ship's log, a latitude controlling element and a longitude controlling element each connected to the respective indicators, and means controlled by said first mentioned element for variably operating the latitude and longitude elements.

8. In a device for indicating the position of a vessel on the earth, a latitude indicator, a longitude indicator, a ship's log and a compass, an element mounted for rotation on two different axes, means for orienting said element about one axis in accordance with the indication of said compass, means for rotating said element upon its other axis as a result of the operation of said ship's log, a latitude controlling element and a longitude controlling element each connected to the respective indicators, and means controlled by said first mentioned element for periodically operating the latitude and longitude elements.

9. In a device for indicating the position of a vessel on the earth, a latitude indicator, a longitude indicator, an element mounted for rotation about two different axes, means for orienting said element about one axis in accordance with the direction of travel of the vessel, and means for rotating it about the other axis in accordance with the distance travelled by the vessel, and means controlled by said element for operating said indicators.

10. In a device for indicating the position of a vessel on the earth, a latitude indicator, a longitude indicator, an element mounted for rotation about two different axes, means for orienting said element about one axis in accordance with the direction of travel of the vessel, and means for rotating it through a definite arc at intervals controlled by the distance travel of the vessel, and means controlled by said element for operating said indicators.

11. In a device for indicating the position of a vessel on the earth, a latitude indicator, a longitude indicator, a circular element mounted for rotation about two axes, a connection between said element and said latitude indicator in the plane of one of said axes, a connection between said element and said longitude indicator mounted in a position 90 degrees from the first connection, means for orienting said element about one axis in accordance with the direction of travel of the vessel and means for rotating said element about the other axis to operate said indicators through said connections variably.

12. In a device for indicating the position of a vessel on the earth, a latitude indicator, a longitude indicator, a circular element mounted for movement along one axis, a rotatable frame for supporting said element, a wheel adapted to be engaged by said element during its rotation, a second wheel also adapted to be engaged by said element during its rotation, connections between the first wheel and said latitude indicator and connections between the second wheel and said longitude indicator, means for rotating said rotatable frame in accordance with the direction of travel of said ship, and means for rotating said element in accordance with the distance travel of said ship.

13. In a device for indicating the position of a vessel on the earth, a latitude indicator, a longitude indicator, a circular element mounted for movement along one axis, a rotatable frame for supporting said element, a wheel adapted to be engaged by said element during its rotation, a hemisphere mounted for rotation on two different axes, means for causing said element to rotate said hemisphere about one of said axes and means controlled from said wheel for rotating said hemisphere about the other of its axes, and connections between said wheel and said latitude indicator and said hemisphere and said longitude indicator.

14. In a device for indicating the position of a vessel on the earth, a supporting frame, a latitude indicator and a longitude indicator mounted on said frame, a shaft rotatably mounted in said frame, a supporting bracket attached to the shaft, an element pivotally mounted in said bracket, means for orienting said shaft about its axis in accordance with the direction of travel of the ship, means for rotating said element about its axis in accordance with the distance traveled by said ship and means controlled by said element for operating said indicators.

15. In a device for indicating the position of a vessel on the earth, a supporting frame, a latitude indicator and a longitude indicator mounted on said frame, a shaft rotatably mounted in said frame, a supporting bracket attached to the shaft, an element pivotally mounted in said bracket, means for orienting said shaft about its axis in accordance with the direction of travel of the ship, means for rotating said element about its axis in accordance with the distance traveled by said ship, a connection from said element to said latitude indicator, a connection from said element to said longitude indicator, and means operative as a result of the movement of said element for variably operating said indicators through said connections.

16. In a device for indicating the position of a vessel on the earth, a supporting frame, a latitude indicator and a longitude indicator mounted on said frame, a shaft rotatably mounted in said frame, a supporting bracket attached to the shaft, an element pivotally mounted in said bracket, means for orienting said shaft about its axis in accordance with the direction of travel of the ship, a motor mounted in said frame, means for operating said motor periodically in accordance with the distance traveled by said ship, means controlled by said motor for shifting the said element on its axis and means operative by the movement of said element for variably operating said latitude and longitude indicators.

17. In a device for indicating the position of a vessel on the earth, a supporting frame, a latitude indicator and a longitude indicator mounted on said frame, a shaft rotatably mounted in said frame, a bracket mounted on said shaft, an element pivotally supported in said bracket, a shaft mounted for sliding movement in said bracket, a motor mounted on said frame, means for orienting the first mentioned shaft in accordance with the direction of travel of the vessel, means controlled by said motor for sliding said shaft to tilt said element, and means controlled by the element for variably operating said indicators.

18. In a device for indicating the position of a vessel on the earth, a supporting frame, a latitude indicator and a longitude indicator mounted on said frame, a shaft rotatably mounted in said frame, a bracket mounted on said shaft, an element pivotally supported in said bracket, a shaft mounted for sliding movement in said bracket, a motor mounted on said frame, means for orienting the first mentioned shaft in accordance with the direction of travel of the vessel, means controlled by said motor for periodically sliding said shaft to tilt said element, and means controlled by the element for variably operating said indicators.

19. In a device for indicating the position of a vessel on the earth, a latitude indicator, a longitude indicator, an element mounted for rotation upon two different axes to control the operation of said indicators, means for orienting said element about one of its axes in accordance with the direction of travel of the ship, means for rotating said element about its other axis as a result of the operation of the ship's log, and means for periodically causing said element to variably operate said indicators.

20. In a device for indicating the position of a vessel on the earth, a latitude indicator, a longitude indicator, an element mounted for rotation upon two different axes to control the operation of said indicators, means for orienting said element about one of its axes in accordance with the direction of travel of the ship, means for periodically rotating said element about its other axis as a result of the operation of the ship's log, and means for periodically causing said element to variably operate said indicators.

21. In a device for indicating the position of a vessel on the earth, a latitude indicator, a longitude indicator, an element mounted for rotation upon two different axes to control the operation of said indicators, means for continuously orienting said element about one of its axes in accordance with the direction of travel of the ship, means for rotating said element about its other axis as a result of the operation of the ship's log, and means for periodically causing said element to variably operate said indicators.

22. In a device for indicating the position of a vessel on the earth, a main supporting frame, a latitude indicator and a longitude indicator mounted on said frame, a shaft rotatably mounted in said frame, a bracket, a tilting connection between said bracket and said shaft, an element pivotally supported in said bracket, means for orienting said shaft in accordance with the direction of travel of said vessel, means for tilting said element in accordance with the distance travelled by said vessel, a connection from said element to said latitude indicator, a connection from said element to said longitude indicator, and means for swinging said bracket on its pivotal mounting to the shaft to periodically affect said indicators through said connections.

23. In a device for indicating the position of a vessel on the earth, a latitude indicator, a longitude indicator, an element mounted for rotation upon two different axes to control the operation of said indicators, means for orienting said element about one of its axes in accordance with the direction of travel of the ship, means for rotating it about the other axis as a result of the distance travelled by said ship to operate said indicators directly, and means controlled by said element to change the effect of its operation on the longitude indicator as a result of its operation of the latitude indicator.

24. In a device for indicating the position of a vessel on the earth, a latitude indicator, a longitude indicator, an element mounted for rotation upon two different axes, a motor for orienting said element about one of its axes as a result of the direction of travel of said vessel, a second motor, means controlled by the second motor for tilting said element about the other of its axes in accordance with the distance travelled by said ship, and means controlled by said element for variably operating said indicators.

25. In a device for indicating the position of a vessel on the earth, a latitude indicator, a longitude indicator, an element mounted for rotation upon two different axes, a motor for orienting said element about one of its axes as a result of the direction of travel of said vessel, a second motor, means controlled by the second motor for periodically tilting said element about the other of its axes in accordance with the distance travelled by said ship, and means controlled by said element for variably operating said indicators.

26. In a device for indicating the position of a vessel on the earth, a latitude indicator, a longitude indicator, an element mounted for rotation on two different axes, means for orienting said element on one of its axes in accordance with the direction of travel of the ship, means for tilting it about the other of its axes in accordance with the distance travelled by the vessel, a wheel mounted in the path of travel of said element, connections between said wheel and said latitude indicator, a second wheel mounted in the path of travel of said element, connections between said second wheel and said longitude indicator, and means for periodically causing said element to operate said wheels.

27. In a device for indicating the position of a vessel on the earth, a latitude indicator, a longitude indicator, an element mounted for rotation on two different axes, means for orienting said element on one of its axes in accordance with the direction of travel of the ship, means for tilting it about the other of its axes in accordance with the distance travelled by the vessel, a wheel mounted in the path of travel of said element, connections between said wheel and said latitude indicator, a second wheel mounted in the path of travel of said element at an angle of 90 degrees to the first wheel, connections between said second wheel and said longitude indicator, and means for periodically causing said element to operate said wheels.

28. In a device for indicating the position of a vessel on the earth, a latitude indicator, a longitude indicator, an element mounted for rotation on two different axes, means for orienting said element on one of its axes in accordance with the direction of travel of the ship, means for tilting it about the other of its axes in accordance with the distance travelled by the vessel, a wheel mounted in the path of travel of said element, connections between said wheel and said latitude indicator, a hemisphere mounted for movement about two different axes in the path of travel of said element, connections between said hemisphere and said longitude indicator, and means controlled by said element for operating said wheel to operate said latitude indicator, and for operating said hemisphere about one axis to operate said longitude indicator.

29. In a device for indicating the position of a vessel on the earth, a latitude indicator, a longitude indicator, an element mounted for rotation on two different axes, means for orienting said element on one of its axes in accordance with the direction of travel of the ship, means for tilting it about the other of its axes in accordance with the distance travelled by the vessel, a wheel mounted in the path of travel of said element, connections between said wheel and said latitude indicator, a hemisphere mounted for movement about two different axes in the path of travel of said element, connections between said hemisphere and said longitude indicator, means controlled by said element for operating said wheel to operate said latitude indicator and for operating said hemisphere about one axis to operate said longitude indicator, and means controlled by the first wheel for rotating said hemisphere on its other axis.

30. In a device for indicating the position of a vessel on the earth, a latitude indicator, a longitude indicator, an element mounted for rotation on two different axes, means for orienting said element on one of its axes in accordance with the direction of travel of the ship, means for tilting it about the other of its axes in accordance with the distance travelled by the vessel, a wheel mounted in the path of travel of said element, connections between said wheel and said latitude indicator, a hemisphere mounted for movement about two different axes in the path of travel of said element, connections between said hemisphere and said longitude indicator, means controlled by said element for operating said wheel to operate said latitude indicator and for operating said hemisphere about one axis to operate said longitude indicator, means controlled by the first wheel for rotating said hemisphere on its other axis and means controlled by the movement of said hemisphere on its second axis to alter the effect of the movement on its first mentioned axis on the longitude indicator.

31. In a device for indicating the position of a vessel on the earth, a latitude indicator, a longitude indicator, an element mounted for rotation upon two different axes, means for orienting it about one axis in accordance with the direction of travel of the vessel and means for tilting it on the other axis in accordance with the distance travelled by the ship, a connection between said element and the longitude indicator, a connection between said element and the latitude indicator, means controlled by said element for variably operating said indicators through said connections, and means for reversing the effect of the movement of said element on said latitude indicator.

32. In a device for indicating the position of a vessel on the earth, a latitude indicator, a longitude indicator, an element mounted for rotation on two different axes, means for orienting said element on one of its axes in accordance with the direction of travel of the ship, means for tilting it about the other of its axes in accordance with the distance travelled by the vessel, a wheel mounted in the path of travel of said element, connections between said wheel and said latitude indicator, a second wheel mounted in the path of travel of said element, connections between said second wheel and said longitude indicator, means for periodically causing said element to operate said wheels, and means for reversing the effect of the movement of the latitude receiving wheel on the longitude indicator.

33. In a device for indicating the position of a vessel on the earth, a latitude indicator, an element mounted for rotation upon two axes, means for orienting said element about one of its axes in accordance with the direction of travel of the vessel, and means for orienting it about the other axis in accordance with the distance travelled by said vessel, and means controlled by said element for operating said indicator.

34. In a device for indicating the position of a vessel on the earth, a latitude indicator, an element mounted for rotation upon two axes, means for orienting said element about one of its axes in accordance with the direction of travel of the vessel, and means for periodically tilting said element on its other axis in accordance with the distance travelled by said vessel, and means controlled by said element for operating said indicator.

35. In a device for indicating the position of a vessel on the earth, a latitude indicator, an element mounted for rotation upon two axes, means for orienting said element about one of its axes in accordance with the direction of travel of the vessel, means for orienting it about the other axis in accordance with the distance travelled by said vessel, a wheel mounted in the path of movement of said element and connections between said wheel and said latitude indicator.

36. In a device for indicating the position of a vessel on the earth, a longitude indicator, an element mounted for rotation upon two axes, means for orienting said element about one of its axes in accordance with the direction of travel of the vessel, and means for orienting it about the other axis in accordance with the distance travelled by said vessel, and means controlled by said element for operating said indicator.

37. In a device for indicating the position of a vessel on the earth, a longitude indicator, an element mounted for rotation upon two axes, means for orienting said element about one of its axes in accordance with the direction of travel of the vessel, and means for periodically tilting said element on its other axis in accordance with the distance travelled by said vessel, and means controlled by said element for operating said indicator.

38. In a device for indicating the position of a vessel on the earth, a longitudinal indicator, a movable element, means for orienting said element in one position in accordance with the direction of travel of the vessel, and means for moving said element in another position in accordance with the distance travelled by said vessel, and means controlled by said element for operating said indicator.

39. In a device for indicating the position of a vessel on the earth, a latitude indicator, a longitude indicator, a ship's log and a compass, a movable element for controlling the operation of said indicators, means for moving said element in one position as a result of the operation of said ship's log, and means for moving said element in another position as a result of the operation of said compass.

40. In a device for indicating the position of a vessel on the earth, a latitude indicator, a longitude indicator, a ship's log and a compass, an element mounted for rotation upon two different axes to control the operation of said indicators, and means for correlating the action of said log and compass to operate said indicators.

41. In a device for indicating the position of a vessel on the earth, a latitude indicator, a longitude indicator, a ship's log and a compass, a pivoted element for controlling the indicators, and means for operating said element from said ship's log and from said compass.

GEORGE B. CROUSE.